US010021204B2

(12) United States Patent
Ainsworth et al.

(10) Patent No.: US 10,021,204 B2
(45) Date of Patent: Jul. 10, 2018

(54) TEST PROXY BETWEEN CLIENT APPLICATIONS AND WEB SERVICES

(71) Applicant: CA, Inc., New York, NY (US)

(72) Inventors: John Ainsworth, Mount Sinai, NY (US); John Thomas Devine, Kings Park, NY (US)

(73) Assignee: CA, Inc., New York, NY (US)

( * ) Notice: Subject to any disclaimer, the term of this patent is extended or adjusted under 35 U.S.C. 154(b) by 94 days.

(21) Appl. No.: 15/207,681

(22) Filed: Jul. 12, 2016

(65) Prior Publication Data

US 2018/0020074 A1      Jan. 18, 2018

(51) Int. Cl.
| G06F 15/16 | (2006.01) |
| H04L 29/08 | (2006.01) |
| H04L 29/06 | (2006.01) |
| H04L 12/26 | (2006.01) |

(52) U.S. Cl.
CPC .......... H04L 67/2819 (2013.01); H04L 43/16 (2013.01); H04L 67/42 (2013.01); H04L 67/02 (2013.01)

(58) Field of Classification Search
CPC ......... H04L 67/02; H04L 67/42; H04L 43/16; H04L 63/0281; H04L 63/083; H04L 29/06755; H04L 29/0809; H04L 63/0227; H04L 63/10; G06F 17/2785; G06F 17/30507
USPC ....... 709/202, 203, 219, 220, 223, 224, 227, 709/230; 726/1, 4, 13
See application file for complete search history.

(56) References Cited

U.S. PATENT DOCUMENTS

| 2004/0073811 | A1* | 4/2004 | Sanin | H04L 63/0263 |
| | | | | 726/13 |
| 2004/0073881 | A1* | 4/2004 | Nassif | G06F 17/5072 |
| | | | | 716/115 |
| 2011/0022560 | A1* | 1/2011 | Breiter | G06N 5/04 |
| | | | | 706/47 |
| 2011/0055673 | A1* | 3/2011 | Teng | G06F 21/41 |
| | | | | 715/200 |
| 2011/0238738 | A1* | 9/2011 | Wu | H04L 67/1095 |
| | | | | 709/203 |
| 2012/0173607 | A1* | 7/2012 | Connan | G06F 17/3089 |
| | | | | 709/203 |
| 2013/0227078 | A1* | 8/2013 | Wei | H04L 67/2814 |
| | | | | 709/219 |

(Continued)

*Primary Examiner* — Dustin Nguyen
*Assistant Examiner* — Hao Nguyen
(74) *Attorney, Agent, or Firm* — Gilliam IP PLLC

(57) ABSTRACT

A client request originating from a client device and destined for a server via a network is intercepted. The server is configured to perform a service in response to the client request. A determination is made of whether the request action and the request resource of the client request matches a pattern action and a pattern resource of a pattern in a rule. Based on a determination there is a match, a determination is made of whether a threshold trigger condition in the rule is satisfied based. In response to the threshold trigger condition being satisfied, a determination is made of whether a reset condition in the rule is not satisfied. In response to the reset condition not being satisfied, at least one rule action associated with the pattern is performed, wherein performing the at least one rule action comprises returning an errored response back to the client device.

20 Claims, 5 Drawing Sheets

(56) References Cited

U.S. PATENT DOCUMENTS

| | | | |
|---|---|---|---|
| 2016/0127461 A1* | 5/2016 | Levow | H04L 67/306 709/219 |
| 2016/0127488 A1* | 5/2016 | Papakostas | H04L 67/22 709/224 |
| 2016/0142553 A1* | 5/2016 | Gandhi | H04M 15/39 455/406 |
| 2016/0381048 A1* | 12/2016 | Zhao | H04L 63/1416 726/23 |
| 2017/0068706 A1* | 3/2017 | Bray | G06F 17/30507 |
| 2017/0118251 A1* | 4/2017 | Roth | H04L 63/205 |

* cited by examiner

TEST PROXY BETWEEN CLIENT APPLICATIONS AND WEB SERVICES

BACKGROUND

The disclosure generally relates to the field of data processing, and more particularly to a test proxy between client applications and web services.

The number of web (or application) services and client devices using such web services continue to grow. Web services allow various applications from different sources to communicate with each other via various standardized approaches. Web services can provide business logic, data, processes, etc. using a programmatic interface over a network. For example, communications with web services can be based on a Representational State Transfer (REST) Application Programming Interface (API). Web services are typically self-contained, distributed applications that can be invoked over a network to provide various services. The types of web services can vary greatly. For example, a major web service can provide data storage management. More limited web services can return the weather in a particular city, updates on a bid from an online auction, etc.

BRIEF DESCRIPTION OF THE DRAWINGS

Embodiments of the disclosure may be better understood by referencing the accompanying drawings.

DESCRIPTION

Figure 1:
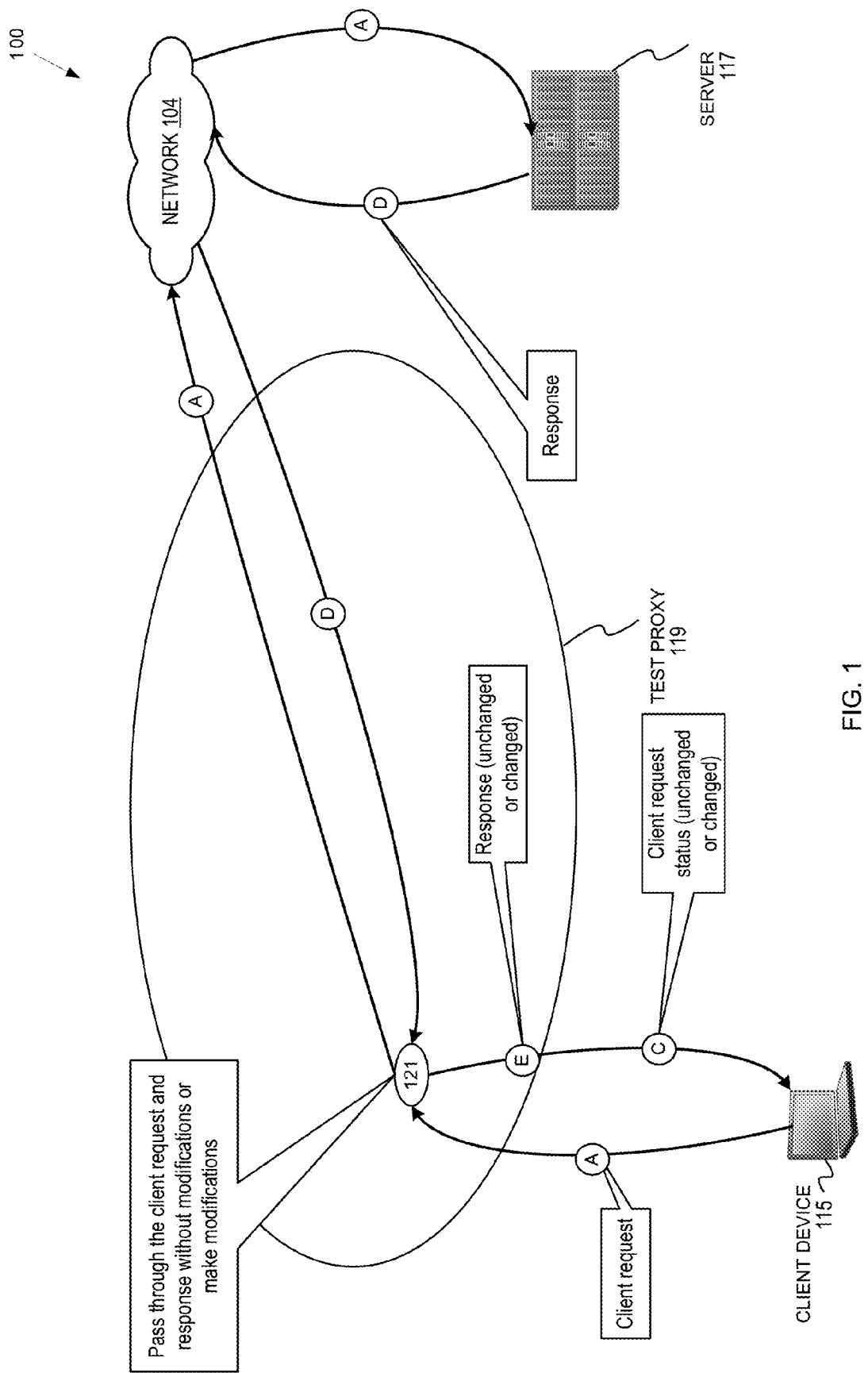
FIG. 1 depicts an example system having a proxy positioned between a client device and a server, wherein the proxy is configured to test client applications by altering responses to client requests' responses to various failures, according to some embodiments.

The description that follows includes example systems, methods, techniques, and program flows that embody aspects of the disclosure. However, it is understood that this disclosure may be practiced without these specific details. For instance, this disclosure refers to using REST APIs in illustrative examples. But aspects of this disclosure can be applied to other types of communication protocols to access web services. In other instances, well-known instruction instances, protocols, structures and techniques have not been shown in detail in order not to obfuscate the description.

Overview

Some embodiments provide for testing of various failures of client applications and web services. According to some embodiments, a test proxy positioned between the client applications and web services acts on the data passing between the client and server in order to implement the changes required for various test scenarios. This testing can occur during a client-web service interaction and can be induced without requiring modification to either the client application or the web service. Frequency and type of failure is under test control, and failures may be induced in a way that is either completely random or which allows for repeatable testing. In some embodiments, the test proxy provides a reliable and repeatable simulation of failure scenarios of REST API calls.

The test proxy intercepts client requests originating from the client device that are destined for the backend server hosting the web service. The test proxy can then compare each client request against a rule set having one or more rules. If the client request matches a rule, one or more associated actions for the rule can be triggered. Examples of triggered actions include returning an errored response, return a failed status without providing a response, modifying or adding rules for a same and/or different client request, etc.

If the client request does not satisfy a rule, the test proxy forwards the client request to the web service for processing without performing any triggered action. In turn, the test proxy can forward the response from the web service to this client request back to the client also without performing any triggered action. In other words, if no action is triggered, the response and the return status from the web service can be returned to the client without modification.

Terminology

This description uses the term "service" to refer to various types of web or application services accessible by client applications executing on client devices. The service can be hosted by a backend server that is communicatively coupled to client devices over a network. These services can provide business logic, data, processes, etc. using a programmatic interface over a network.

This description uses the term "test proxy" or "proxy" to refer to any logic, device, apparatus, etc. configured to intercept client requests from a client application destined for any type of service. The test proxy is also configured to perform various actions if a client request matches a rule in a rule set. The various actions can include altering the client request, altering the response to the client request received from the backend server, altering a status of the client request, modifying rules for a same or different client request, etc. For example, the test proxy can intentionally introduce errors into the response that is received back from the backend server. For instance, different fields in the response body can be changed to monitor how the client application responds to the errored response. The test proxy can be software, hardware, firmware, or a combination thereof. The test proxy can reside in a separate device on the network that is used for communications between the client devices and the backend servers. Alternatively or in addition, at least part of the functionality of the test proxy can be executing on the client devices and/or backend servers.

Example System Architecture

FIG. 1 depicts an example system having a proxy positioned between a client device and a server, wherein the proxy is configured to test client applications by altering responses to client requests' responses to various failures, according to some embodiments. A system 100 of FIG. 1 includes a client device 115, a test proxy 119, a network 104, and a server 117. The client device 115 is communicatively coupled to the test proxy 119. The test proxy 119 is communicatively coupled to the server 117 via the network 104. The test proxy 119 can be executable instructions executing in a separate device (e.g., separate server). Alternatively, at least part of the test proxy 119 can be executing in the client device 115 and/or the server 117.

The test proxy 119 is configured to intercept client requests originating from the client device 115 and destined for the server 117. The test proxy 119 can determine whether each client request matches a rule within a rule set. If the client request matches a rule, one or more associated actions for the rule can be triggered. Examples of triggered actions include returning an errored response, return a failed status without providing a response, modifying or adding rules for a same and/or different client request, etc.

The client device 115 transmits a client request A that is intercepted by the test proxy 119. The client request can be based on various protocols. In an example, the client request is a REST API call. For instance, a client request to retrieve resource X based on the REST API using the (Hypertext Transfer Protocol) HTTP protocol can have the following format:

Get //resource X

According to some embodiments, the client request is comprised of an action and the name and location of the resource on which the action is executed. In the above example, the action is "Get", and the name and location is "//resource X." The destination address for the client request is the address of the server 117.

The test proxy 119 intercepts the client request that is destined for the server 117. To configure the system 100 for interception by the test proxy 119, the rules by which the network address is resolved can be modified. For example, a local host file on the client device 115 is added that would override the network address to which the server 117 is resolved. In particular, instead of resolving to the server 117, the network address is resolved to the network address of the test proxy 119. At 121, the test proxy 119 can either pass through the client request A to the server 117 without any modifications. Alternatively at 121, the test proxy 119 makes modifications. The determination of whether to modify or not modify can be based on whether criteria in a rule within a rule set matches the client request A.

A rule set can be stored in a storage accessible by the test proxy 119. The rule set can include one or more rules. In some embodiments, each rule can include a pattern, a threshold trigger condition, a reset condition, and one or more actions. The pattern can have a similar format as the client request. For example, the pattern can include 1) an action (e.g., get, post, etc.) and 2) the name and location of the resource on which the action is taken. Below is an example pattern of requesting a resource or data named "resource-segment":

GET //resource-segment

In this example, the pattern would only be a match for a client request having a GET HTTP method for the exact resource URL "//resource-segment." Below is another example pattern in which wildcards can be used for matching:

*//resource-segment1/*

In this example, a pattern would match a client request for any HTTP method for any resource path starting with "//resource-segment1/".

The test proxy 119 compares a pattern in each of the rules to the client request A to determine if there is a match. For example, the test proxy 119 can determine if there is a match for both the action and the resource (including name and location). With reference to the examples above, the test proxy 119 can determine if both the action (e.g., get, post, etc.) and the URL expression match. In some instances, more than one pattern can match the client request. In these instances, all matching rules across different matches are processed according to a defined order. To account for these instances, a priority attribute can be added to the rules. For multiple matching rules, the rules can be applied in a priority order defined by the priority attribute. For example, assume that both pattern A and pattern B are a match to a client request. Also, assume that pattern A includes a priority attribute having a value of one and pattern B includes a priority attribute having a value of two. In this example, the rules for pattern A would be applied prior to applying the rules for pattern B. Therefore, in these instances, if the same rule is applied multiple times, the last rule processed would be used. Also in some instances, an additional attribute that is a Boolean variable could be added to the rules. This additional attribute could indicate whether additional rules processing continues after a first match (e.g., "continue_rules_processing"). If set to true, the rules continue to be processed for a next match of the pattern. If set to false, the rules for subsequent matches would not be processed. This additional attribute defining whether to continue processing could override the default behavior setting whether one or all rules are processed. In some other embodiments, if there is more than one pattern match, only rules for the first pattern in the defined order are processed. With reference to the example above, only the rules for pattern A would be processed while rules for pattern B would not.

At 121, if there is no match with a pattern in one of the rules, the test proxy 119 passes through the client request to the server 117 without any modifications. Also if there is no match, the test proxy 119 passes through the response received back from the server 117 to the client device 115 without any modifications.

According to some embodiments, prior to making any modifications, the test proxy 119 determines whether additional criteria defined in the rule are satisfied/not satisfied. In this example, the additional criteria for the rule include the threshold trigger condition and the reset condition. A threshold trigger condition defines a percentage threshold for triggering the rule. For example, a threshold trigger condition having a percentage threshold of zero results in the rule never being triggered. However, a threshold trigger condition having a percentage threshold of 100 results in the rule being triggered on every pattern match. Parameters of a threshold trigger condition for a rule can be configurable. For example, the percentage threshold (e.g., 0-100) can be set.

Additionally, random values can be used for evaluating a threshold trigger condition. For example, each time the threshold trigger condition is evaluated, a random value can be generated. If the random value is greater than the percentage threshold, the threshold trigger condition is satisfied. Otherwise, the threshold trigger condition is not satisfied. In some embodiments, a particular instance of a pseudo-random number generator is created and used to generate the random value. Additionally, if the random number generator is a pseudo-random number generator, another configurable value is the initial deterministic seed value. Use of a same pseudo-random number generator with a same initial deterministic seed value allows testing to be reproducible. In particular, if a same seed deterministic value for a same pseudo-random number generator are used, the random values output each time the threshold trigger condition is evaluated will be the same. Accordingly, in these situations, the testing across multiple threshold trigger condition evaluations is reproducible. In some instances, different types of random number generators (RNG) can be used. In these instances, another configurable parameter can be the type of RNG that is to be used to generate the random values. Examples of the type of RNGs include a pseudo-random number generator (such as yarrow, wichmann-hill, etc.), hardware (true) RNGs (TRNGs), etc.

Also, in some embodiments, once a rule is triggered (i.e., the threshold trigger condition is satisfied), all subsequent matches against the pattern with automatically trigger the action(s) for the rule until the reset condition is met. Therefore, another criteria in the rule can be a reset condition. A reset condition for a rule defines the condition under which the action(s) defined for a rule is no longer performed and under which the threshold trigger condition is to be satisfied again prior to performing the action(s). The reset condition can be evaluated each time a rule is triggered.

In some instances, the reset condition can be based on a consecutive count. For example, an integer value can be set for the number of consecutive times a match will trigger the action(s) for the rule. Each time the rule is evaluated based on a match, the integer value is decremented. Once the integer value reaches zero, the next time the rule is evaluated based on a match, the threshold trigger condition must again be satisfied to trigger the action(s) for the rule.

In some other instances, the reset condition can be based on a random value in comparison to a percentage threshold (similar to determining the threshold trigger condition). In these instances, the reset condition would include a percentage threshold for resetting. For example, a reset condition having a percentage threshold of zero results in the rule never being reset. However, a reset condition having a percentage threshold of 100 results in the rule being reset on every pattern match. Parameters of a reset condition for a rule can be configurable. For example, the percentage threshold (e.g., 0-100) can be set.

Additionally, random values can be used for evaluating a reset condition. For example, each time the reset condition is evaluated, a random value can be generated. If the random value is greater than the percentage threshold, the reset condition is satisfied. Otherwise, the reset condition is not satisfied. In some embodiments, a particular instance of a pseudo-random number generator is created and used to generate the random value. Additionally, if the random number generator is a pseudo-random number generator, another configurable value for the reset condition is the initial seed value. Like the threshold trigger condition, use of a same pseudo-random number generator with a same initial seed value allows testing to be reproducible. In particular, if a same seed value for a same pseudo-random number generator are used, the random values output each time the reset condition is evaluated will be the same. Accordingly, in these situations, the testing across multiple reset condition evaluations is reproducible. In some instances, different types of random number generators (RNG) can be used. In these instances, another configurable parameter can be the type of RNG that is to be used to generate the random values. Examples of the type of RNGs include a pseudo-random number generator (such as yarrow, wichmann-hill, etc.), hardware (true) RNGs (TRNGs), etc. In some embodiments, the trigger threshold evaluation and the reset condition evaluation can use a same randomizer. In other embodiments, a different randomizer is used. Additionally, in some embodiments, the trigger threshold evaluation and the reset condition evaluation can use a same percentage. In other embodiments, different percentages can be used.

Below is an example syntax for a rule that includes the threshold trigger condition and the reset condition for the pattern "Pattern RR":

```
{
    "Pattern " : "Pattern RR ",
        "triggerCondition" : {
            "frequency" : "n",
            "Randomizer" : "BBBB" - Optional, in this
                exemplar implementation BBBB is an integer and
                serves as both the identifier and the initial seed
                value.
            "RNG":"yarrow" -- Optional, in this example caller
                specifies that a random number generator using the
                'yarrow' algorithm is to be used.
        },
        "resetCondition" : "x | y%",
        "actions" : [ -- ACTIONS TO BE PERFORMED -]
        "continue_rules_processing": "true" -- Optional
{
```

For the threshold trigger condition, the frequency "n" is the percentage threshold that can be set to a value between zero and 100. The RNG type "BBBB" is the type of RNG to be used (e.g., pseudo-random number generator). For the reset condition, "x" is for the reset condition that is based on the consecutive count. In this example, "x" is the initial integer value that is decremented until zero is reached (as described above). Also for the reset condition, "y" is for the reset condition that is based on a random value in comparison to a percentage threshold. In this example, "y" is the percentage threshold that can be set to a value between zero and 100. The example syntax for a pattern depicted above includes "actions", which can be a list of one or more entries.

Therefore, for a given rule, if a pattern is matched with the client request and the threshold trigger condition in the rule is satisfied and the reset condition in the rule is not satisfied, one or more actions defined in the rule are performed to make various modifications. In some embodiments, the modifications can include altering a status of the client request A that is returned to the client device 115. For example, the status of the client request A can be set to fail. The status of the client request A can also be set to other values (as further described below). As shown in FIG. 1, a status C of the client request (changed or unchanged) is returned to the client device 115. For example, the status C can be returned while waiting for a response D back from the server 117.

Another example modification based on an action defined in the rule can include delaying transmission of the client request A to the server 117. In another instance, a modification can include delaying transmission of the response to the client request A (received back from the server 117) back to the client device 115.

Another example modification can include modifying the response that is received back from the server 117. For example, the modification can cause the response to include errors to assess how the client application responds. As shown in FIG. 1, a response E (changed or unchanged) is returned to the client device 115.

Figure 2:
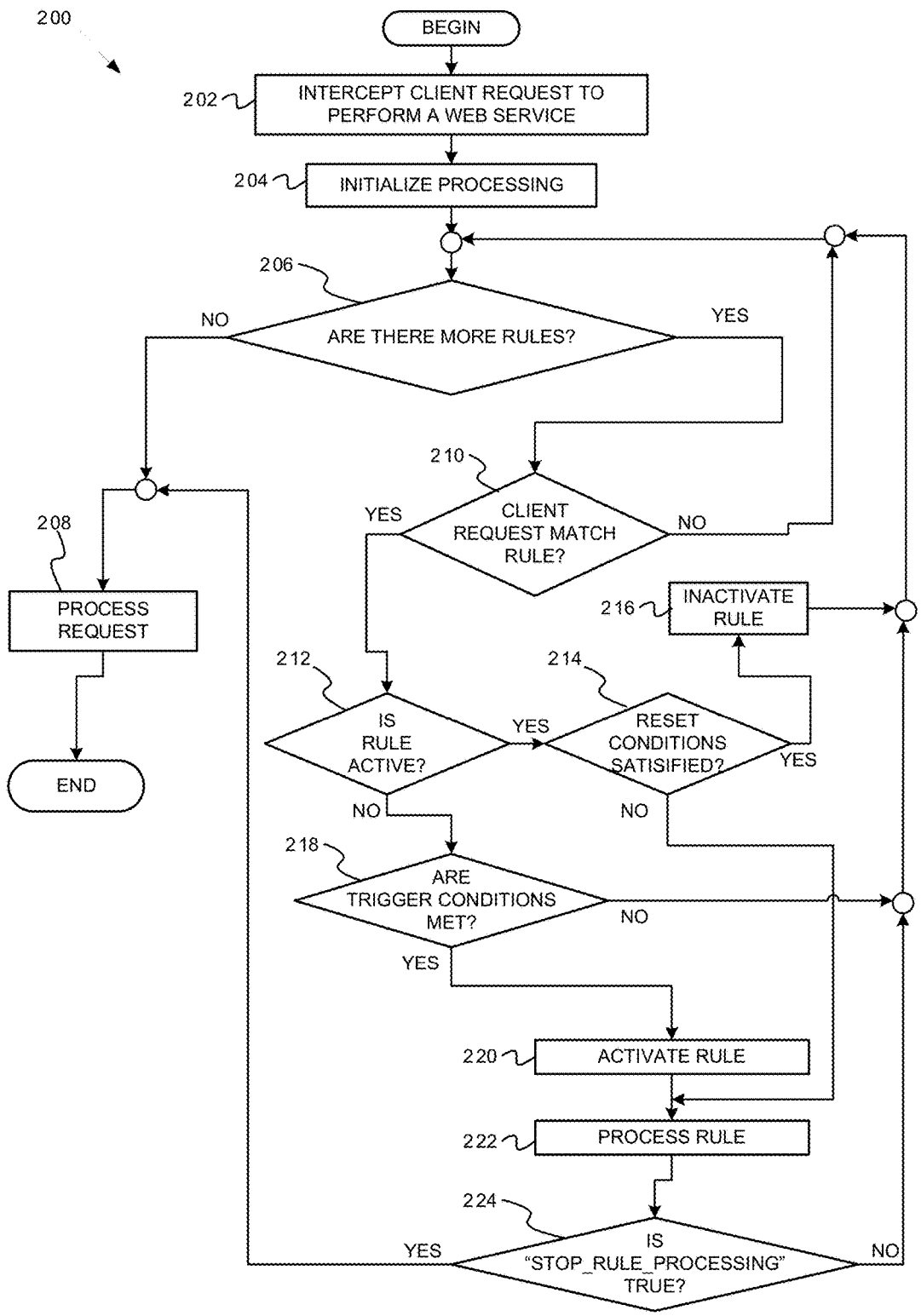
FIG. 2 depicts a flowchart of operations for testing client applications based on altered responses to client requests, according to some embodiments.

Another example modification can include changes to the rule set. For example, a rule can be added, deleted, modified, reset, etc. The changes can be to the current rule having a pattern that matches the client request A. Alternatively, the changes can be to a different rule having a different pattern. A more detailed description of example actions causing these different modifications is set forth below in reference to the operations depicted in FIGS. 2-4.

Example Operations

Figure 3:
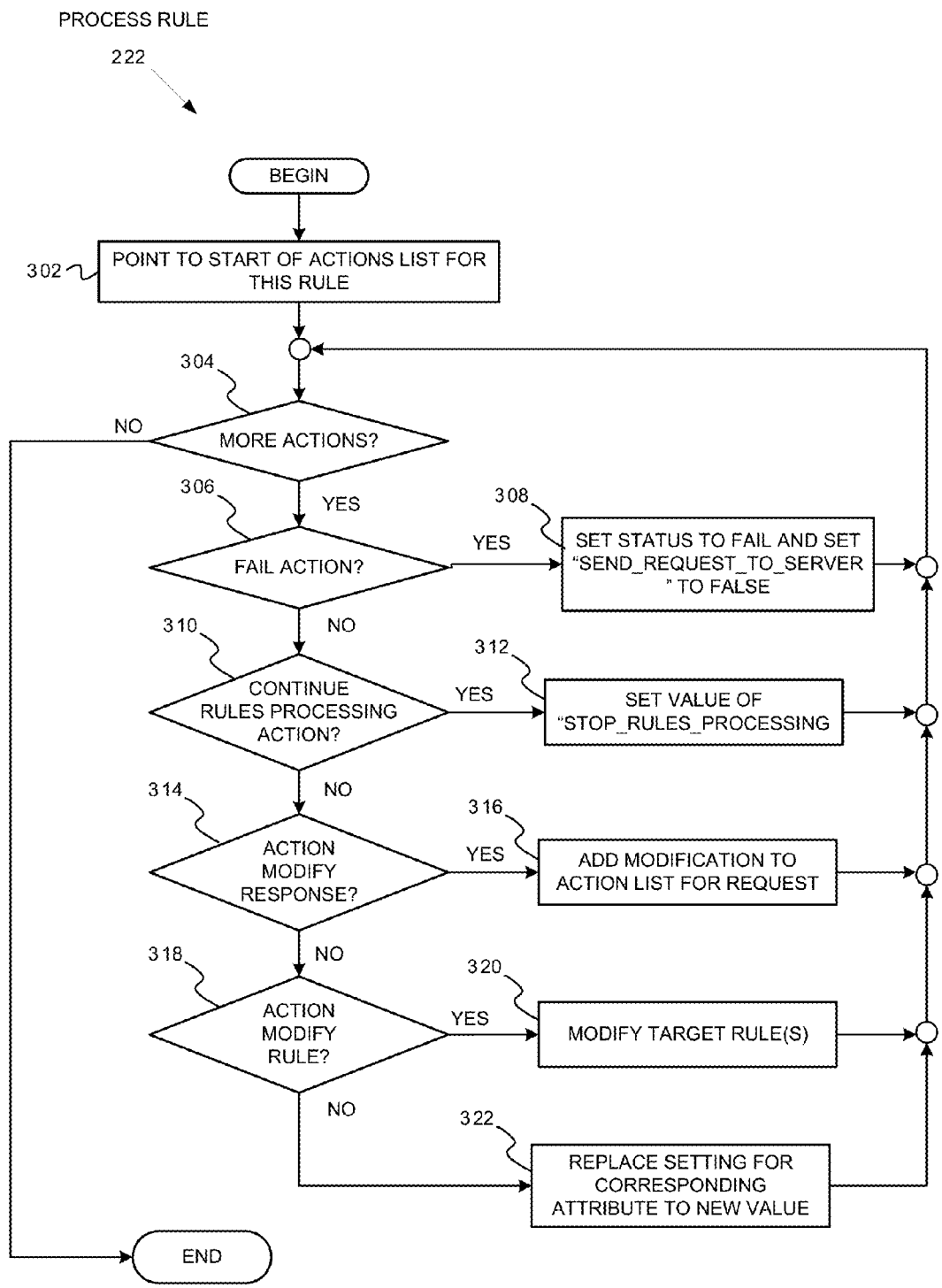
FIG. 3 depicts a flowchart for processing a rule as part of testing the client applications, according to some embodiments.
Figure 4:
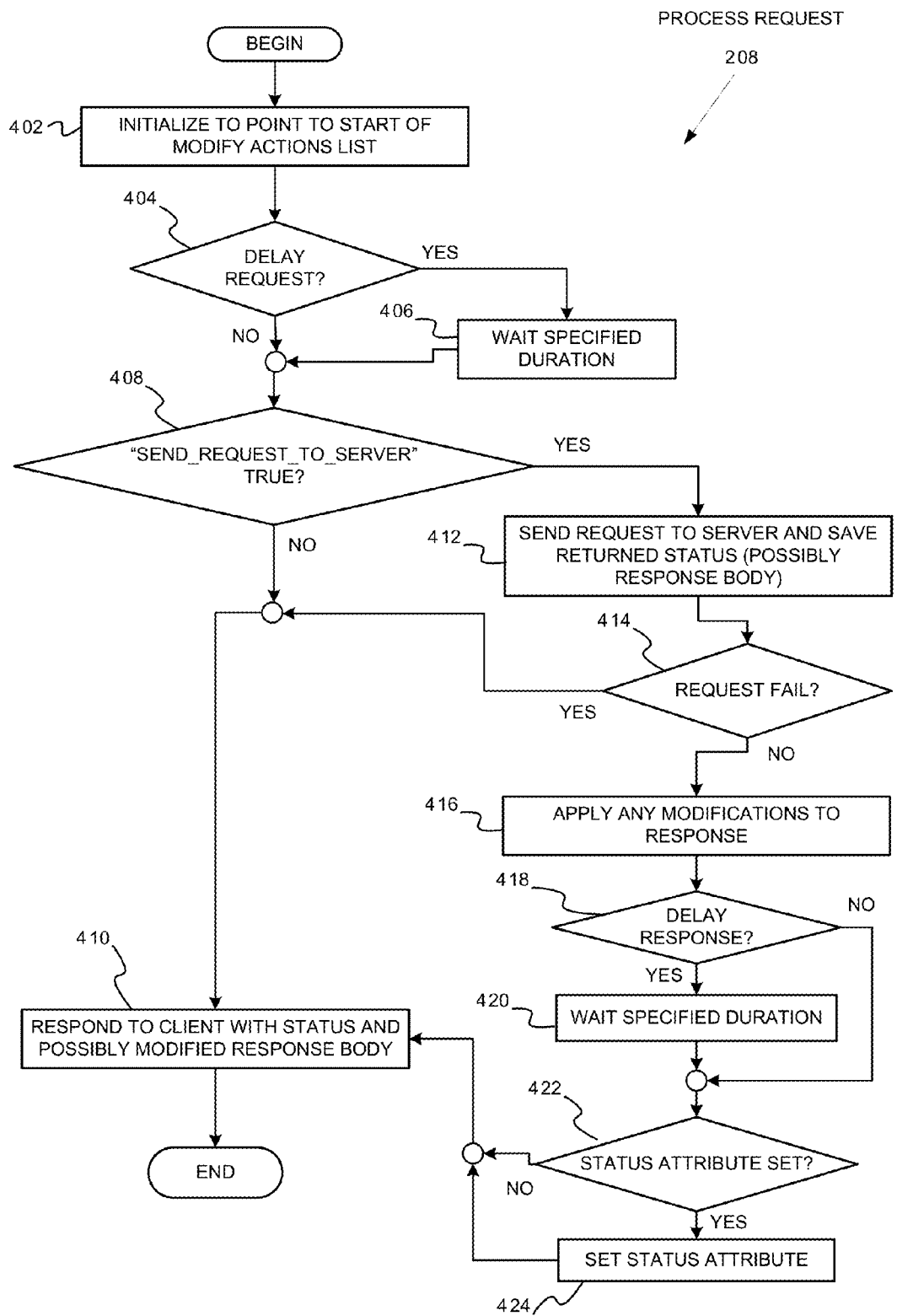
FIG. 4 depicts a flowchart for processing a client request as part of testing the client applications, according to some embodiments.

To further illustrate operations of the system 100 of FIG. 1, FIGS. 2-4 depicts flowcharts of operations for testing client applications based on altered responses to client requests, according to some embodiments. A flowchart 200 of FIG. 2, a flowchart 300 of FIG. 3, and a flowchart 400 of FIG. 4 are described with reference to FIG. 1. The flowcharts 300-400 depicts more detailed operations of operations depicted in the flowchart 200. Specifically, the flowchart 300 depicts more detailed operations for processing a rule (see 222 of FIG. 2). The flowchart 400 depicts more detailed operations for processing a request (see 208 of FIG. 2). Operations of the flowcharts 200-400 can be performed by software, firmware, hardware or a combination thereof (see for example the test proxy 119 in FIG. 1). The operations of the flowchart 200 start at block 202.

A client request to perform a web service is intercepted (202). With reference to the example of FIG. 1, the test proxy 119 intercepts the client request A originating from the client device 115 and destined for the server 117. As described above, to configure the system 100 for interception by the test proxy 119, the rules by which the network address is resolved can be modified so that the network address that was resolving to the server 117 is updated to resolve to the network address of the test proxy 119.

Processing is initialized (204). With reference to the example of FIG. 1, the test proxy 119 initializes processing of the intercepted client request. For example, the test proxy 119 can reset the list of actions to be performed in response to a client request matching a pattern. Also, the test proxy 119 can reset various Boolean variables used in processing the client request. For example, the Boolean variable, "Send_Request_To_Server", is set to true. The Boolean variable, "Stop_Rule_Processing" is set to false. As part of initialization, the test proxy 119 can also point to the start of a prioritized rules list. These Boolean variables and list are described in more detail below.

A determination is made of whether there are more rules to compare to the currently intercepted client request (206). For example, the test proxy 119 can traverse the prioritized rules list to compare each of the rules therein to the currently intercepted client request. The prioritized rules list can define an order in which the rules are to be compared to the client request. This order can be defined by testers, developers, etc. of the test proxy 119. For example, the order can be configured such that rule A is compared to the client request prior to rule B. If there are no more rules, operations continue at 208. If there are more rules, operations continue at 210.

The client request is processed (208). With reference to the example of FIG. 1, the test proxy 119 can process the client request. Operations at 208 are depicted in the flowchart 400, which is described in more detail below. Operations of the flowchart 200 along this path are then complete.

A determination is made of whether the client request matches a pattern in a rule within the rule set (210). As described above in reference to FIG. 1, the test proxy 119 compares a pattern in the rules to the client request A to determine if there is a match. For example, the test proxy 119 can determine if there is a match for both the action and the resource (including name and location). If there is no match, operations return to 206, where a determination is again made of whether there are more rules to process. If there is a match, operations continue at 212.

A determination is made of whether the rule is active (212). With reference to the example of FIG. 2, the test proxy 119 makes this determination. As further described below, a rule becomes active after trigger conditions of the rule are satisfied. Conversely, a rule becomes inactive after reset conditions of the rule are satisfied. If the rule is active, operations continue at 214. If the rule is inactive, operations continue at 218.

A determination is made of whether the reset condition is satisfied. (214). With reference to the example of FIG. 1, the test proxy 119 can make this determination by evaluating the reset condition that is defined in the rule with the matched pattern. A reset condition for a rule defines the condition under which the action(s) defined for a rule is no longer performed and under which the threshold trigger condition is to be satisfied again prior to performing the action(s). The reset condition can be evaluated each time a rule is triggered. As described above, the reset condition can be based on a consecutive count or a random value compared to a percentage threshold. Also, in some embodiments, once a rule is triggered (i.e., the threshold trigger condition is satisfied), all subsequent matches against the pattern with automatically trigger the action(s) for the rule until the reset condition is satisfied. If the reset condition is satisfied, operations of the flowchart 200 continue at 216, wherein no actions for the rule are executed (see above). If the reset condition is not satisfied, operations of the flowchart 200 continue at 222.

The rule is inactivated (216). With reference to the example of FIG. 1, the test proxy 119 inactivates the rule. Accordingly, in order for the actions in the rule to be executed, the trigger conditions for the rule must first be met. Operations return to 206, where a determination is again made of whether there are more rules to process.

From the "no" branch from 212 (the rule is not active), a determination is made of whether trigger conditions for the rule are satisfied (218). With reference to the example of FIG. 1, the test proxy 119 can make this determination by evaluating the threshold trigger condition that is defined in the rule with the matched pattern. As described above, the threshold trigger condition defines a percentage threshold for triggering the rule. Also, the test proxy 119 can generate a random value to be used for evaluating a threshold trigger condition. If the random value is greater than the percentage threshold, the threshold trigger condition is satisfied. Otherwise, the threshold trigger condition is not satisfied (as further described above). In some other embodiments, some type of non-random value (e.g., consecutive count) be compared to a threshold trigger condition. For example, the trigger condition is satisfied after the rule is evaluated N number of times during execution of the client application. If the threshold trigger condition is satisfied, operations of the flowchart 200 continue at 220. If the threshold trigger condition is not satisfied, operations of the flowchart 200 return to 206, where a determination is again made of whether there are more rules to process.

The rule is activated (220). With reference to the example of FIG. 1, the test proxy 119 activates the rule. Accordingly, the rule is now further evaluated to determine if various actions defined in the rule are to be performed (e.g., modifying response to the client request) (see 222 below).

The rule is processed (222). With reference to the example of FIG. 1, the test proxy 119 can process the rule. Operations at 222 are depicted in the flowchart 300, which is described in more detail below.

A determination is made of whether the Boolean variable "Stop_Rule_Processing" is set to true. With reference to the example of FIG. 1, the test proxy 119 can make this determination. This Boolean variable can be set to true based on an action defined in a rule being processed (see 310-312 below). In particular, an action can be defined in a rule to set this Boolean variable to true if the test is configured so that once this rule is processed no additional rules are to be processed. If the Boolean variable "Stop_Rule_Processing" is not set to true, operations of the flowchart 200 return to 206, where a determination is again made of whether there are more rules to process. Otherwise, operations continue at 208, where the client request is processed.

Operations for processing a rule at 222 are now described. In particular, FIG. 3 depicts a flowchart for processing a rule as part of testing the client applications, according to some embodiments. The operations of the flowchart 300 start at block 302.

The start of actions list is pointed to for this rule (302). With reference to the example of FIG. 1, the test proxy 119 can point to the start of the actions list for this rule. The actions list can comprise a list of one or more actions that are to be performed for this rule, in response to the currently intercepted client request matching a pattern for this rule.

A determination is made of whether there are any more actions to process for the rule (304). With reference to the example of FIG. 1, the test proxy 119 can make this determination based on whether the end of the actions list has been reached. If there are no more actions to process, operations of the flowchart 300 are complete. Otherwise, operations of the flowchart 300 continue at 306.

A determination is made of whether the rule having the matched pattern includes an action to create a failed status (306). With reference to the example of FIG. 1, the test proxy 119 determines whether the rule having the matched pattern includes a "fail" action. As described above, each rule can include a list of one or more actions to be executed. The test proxy 119 determines whether action(s) to be executed includes a fail action. Below is an example syntax for an action to create a failed status defined in a rule:

```
{
    "action" : "Fail",
    "returnStatus" : "n" -- status returned
},
```

If there is an action to create a failed status, operations of the flowchart 300 continue at 308. Otherwise, operations of the flowchart 300 continue at 310.

The status of the request is set to fail and the Boolean variable "Send_Request_To_Server" is set to false (308). With reference to the example of FIG. 1, the test proxy 119 can set the status and the Boolean variable. As further described below, the status is returned to the client device in response to receiving a client request. The fail status indicates failure of the client request to be processed and that no response is provided in return to the client request. Accordingly, the Boolean variable "Send_Request_To_Server" is set to preclude transmission of the client request to the server (see 408 of the flowchart 400 below). The status can be an integer value that can be interpreted by the client device 115 that further defines the type of failure. Operations of the flowchart 300 return to 304, where a determination is again made of whether there are other unprocessed actions to be processed in the actions list for this rule.

A determination is made of whether the rule having the matched pattern includes an action to set the Boolean variable "Stop_Rules_Processing" to either true or false (310). With reference to the example of FIG. 1, the test proxy 119 can make this determination. If this Boolean variable is set to true, additional rules are not processed. Otherwise, if this Boolean variable is set to false, additional rules are processed. This Boolean variable allows a tester or developer to configure the testing such that after a given rule is processed, no additional rules are evaluated. If there is an action to set the Boolean variable "Stop_Rules_Processing", operations of the flowchart 300 continue at 312. Otherwise, operations of the flowchart 300 continue at 314.

The Boolean variable "Stop_Rules_Processing" to set to either true or false as defined by in this action (312). With reference to the example of FIG. 1, the test proxy 119 can set this Boolean variable. This Boolean variable is evaluated at 224 of the flowchart 200 after this rule is processed by operations of the flowchart 300. Operations of the flowchart 300 return to 304, where a determination is again made of whether there are other unprocessed actions to be processed in the actions list for this rule.

A determination is made of whether the rule having the matched pattern includes an action to modify the response to the client request (314). With reference to the example of FIG. 1, the test proxy 119 can make this determination. Examples of a modification of the response can include replacing or deleting a part of the response. A rule can have one or more actions for modifying a response. A more detailed description of various examples for modifying the response are set forth below in the description at 416 of the flowchart 400. If there is an action to modify the response, operations of the flowchart 300 continue at 316. Otherwise, operations of the flowchart 300 continue at 318.

The modification to the response is added to the action list for the client request (316). With reference to the example of FIG. 1, the test proxy 119 can add this modification to the action list for this client request. These modifications are performed on the response by the operations at 416 of the flowchart 400 (described below). Operations of the flowchart 300 return to 304, where a determination is again made of whether there are other unprocessed actions to be processed in the actions list for this rule.

A determination is made of whether the rule having the matched pattern includes an action to modify any rules (318). With reference to the example of FIG. 1, the test proxy 119 can make this determination. Examples of modification of a rule can include replacing, deleting, modifying, etc. A rule can have one or more actions for modifying one or multiple rules. Changes can be made to the current rule for the matched pattern being processed. Changes can also be made to a different rule. Additionally, changes to the rule set can include adding a new rule for a new pattern and/or deleting an existing rule (which may or may not be the current rule being processed). For instance, rule A can be modified by three actions defined by the current rule. Rule B can be modified by two other actions defined by the current rule, etc. Additionally, the current rule itself can be modified by one or more actions. A more detailed description of various examples for modifying the rules is set forth below in the description at 320. If there is an action to modify a rule, operations of the flowchart 300 continue at 320. Otherwise, operations of the flowchart 300 continue at 322.

The targeted rules as identified by action(s) in the current rule are modified as defined by the action(s) (320). With reference to the example of FIG. 1, the test proxy 119 can modify the targeted rules.

A first example action to a modification in the rule set is an "add rule" action. The add rule action allows testing of the client application so that once a point of execution of the client application is reached, one or more new rules are added. For example, testing may be configured such that after a particular operation in the client application is complete, failures are introduced in response to certain actions. For instance, in response to "Get resource X" (the current matched pattern) occurring, a new rule is added so that the pattern "Get //resource HH" results in an errored response that produces an error in execution of the client application.

Also, the add rule action can include a repeat parameter. A repeat parameter defines whether this same add rule action is repeated on a subsequent trigger. The repeat parameter can have a value of "never" (which can be the default value). If the repeat parameter is set to "never", the add rule action is not repeated until the current rule is reset. The repeat parameter can also have a value of "once". If the repeat parameter is set to "once", the add rule action is executed the first time the action is triggered for the current rule. However, the add rule action is not executed again until the current rule is reset. The repeat parameter can also have a value of "always". If the repeat parameter is set to "always", the add rule action is executed each time the rule is triggered regardless of whether it is due to the initial trigger condition or failure to satisfy the reset condition. Below is an example syntax for an add rule action defined in a rule:

```
{
"action" : "AddRule",
"repeat" : "Never | Once | Always",
"rule" : {
        "Pattern FF ",
        "triggerCondition" : {
        "frequency" : "n",
        "RNG type" : "BBBB" -- Optional
        },
        "resetCondition" : "x | y%",
        "actions" : [ -- ACTIONS TO BE PERFORMED -]
    }
},
```

In this example syntax, the add rule action causes the test proxy 119 to add a new rule having a "Pattern FF" to the rule set. For the threshold trigger condition, the frequency "n" is the percentage threshold that can be set to a value between zero and 100. The RNG type "BBBB" is the type of RNG to be used (e.g., pseudo-random number generator). For the reset condition, "x" is for the reset condition that is based on the consecutive count. In this example, "x" is the initial integer value that is decremented until zero is reached (as described above). Also for the reset condition, "y" is for the reset condition that is based on a random value in comparison to a percentage threshold. In this example, "y" is the percentage threshold that can be set to a value between zero and 100. The new rule also includes "actions", which can be a list of one or more entries. Also, the add rule action includes the optional repeat parameter as described above.

A second example action to modify a rule is an "reset rules" action. The reset rules action resets one or more rules so that when the associated pattern(s) is matched during subsequent execution, the threshold trigger condition must again be satisfied even if the rule had been previously triggered and the reset condition had not yet been met. This reset rules actions allowing testing of a client application so that once a point of execution of the client application is reached, one or more rules are reset. Below is an example syntax for a reset rules action defined in a rule:

```
{
"action" : "ResetRules",
"repeat" : "Never | Once | Always",
"rules" : "PatternQQQ, PatternTTT"
}
```

Pattern is used to match the rule(s) to be reset. In this example syntax, the reset rules action causes the test proxy 119 to reset the rule having a pattern "PatternQQQ" and the rule having a pattern "PatternTTT". Also, the reset rules action can include the optional repeat parameter as described above for the add rule action.

A third example action to modify a rule is an "modify rules" action. The modify rules action modifies one or more rules when the rule having this action is executed. This modify rules actions allowing testing of a client application so that once a point of execution of the client application is reached, one or more rules are modified. For example, in response to "Get resource ZZ" (the current matched pattern) occurring, a rule can be disabled during the remaining execution of the client application. A rule can modify itself. However, modifications are not applied until after all actions for the current rule are executed.

Below is an example syntax for a modify rules action defined in a rule:

```
{
"action" : "ModifyRules",
"repeat" : "Never | Once | Always",
"rule" : { RuleJJJ }
},
```

In this example syntax, the modify rules action causes the test proxy 119 to modify the rule "RuleJJJ". Similar to the add rule, the entire declaration of the rule can be included in the modify rules action. Also, the modify rules action can include the optional repeat parameter as described above for the add rule action.

A fourth example action to modify a rule is an "delete rules" action. The delete rules action deletes one or more rules from the rule set. Below is an example syntax for a delete rules action defined in a rule:

```
{
"action" : "DeleteRules",
"repeat" : "Never | Once | Always",
"rules" : "PatternHHH"
}
```

Pattern is used to match the rule(s) to be deleted. In this example syntax, the delete rules action causes the test proxy 119 to delete the rule having a pattern "PatternHHH". Also, the delete rules action can include the optional repeat parameter as described above for the add rule action.

After modifying the target rule(s), operations of the flowchart 300 return to 304, where a determination is again made of whether there are other unprocessed actions to be processed in the actions list for this rule.

Setting for the corresponding attribute is replaced with a new value (322). With reference to the example of FIG. 1, the test proxy 119 can perform this replacement. In particular, if operations are at 322, an action is executed. The action can be one or more of the following: 1) set the status of the request to a value, 2) set the attribute (DelayRequest) to a value to cause a delay in sending the client request to the server (see description of 404 of the flowchart 400 below), and 3) set the attribute (DelayResponse) to a value to cause a delay in sending the response to the client request back to the client device (see description of 418 of the flowchart 400 below).

Operations for processing a request at 208 of flowchart 200 are now described. In particular, FIG. 4 depicts a flowchart for processing a client request as part of testing the client applications, according to some embodiments. The operations of the flowchart 400 start at block 402.

Initialization occurs to point to start of the modify actions list for the rule having the matched pattern (402). With reference to the example of FIG. 1, the test proxy 119 can perform the initialization. The actions list can comprise a list of one or more actions that are to be performed for this rule, in response to the currently intercepted client request matching a pattern for this rule.

A determination is made of whether the rule having the matched pattern includes an action to delay forwarding the client request to the server (404). With reference to the example of FIG. 1, the test proxy 119 can make this determination. As described above, each rule can include a list of one or more actions to be executed. The test proxy 119 determines whether action(s) in the rule having the matched pattern includes a delay request action. The delay request action causes the test proxy 119 to delay a defined time before the client request is passed to the server 117. Below is an example syntax for a delay request action defined in a rule:

```
{
"action" : "DelayRequest",
"milliseconds" : G
},
```

In this example syntax, the test proxy 119 delays sending the client request to the server 117 "G" milliseconds. If there is a delay request action, operations of the flowchart 400 continue at 406. Otherwise, operations of the flowchart 400 continue at 408.

Forwarding of the client request is delayed by waiting the specified duration (406). With reference to the example of FIG. 1, the test proxy 119 delays forwarding the client request A to the server 117 based on the delay time defined in the delay request action.

A determination is made of whether the Boolean variable "Send_Request_To_Server" is set to true (408). With reference to the example of FIG. 1, the test proxy 119 can make this determination. As described above, this Boolean variable can be set to false at 308 of the flowchart 300 in response to having an action in the current rule that causes the request to fail. If the Boolean variable "Send_Request_To_Server" is set to true, operations of the flowchart 400 continue at 412. Otherwise, operations of the flowchart 400 continue at 410.

Status and possibly a modified response body is returned to the client in response to the client request (410). With reference to the example of FIG. 1, the test proxy 119 can return the status and possibly a modified response body. As described above, if the status is set to fail, no response is returned. If the status is not set to fail, a response is returned by to the client device. This response may or may not be modified based on the actions defined in the current rule having the matched pattern (see 416 below for description of example modifications to the response). Therefore, if the status is not set to fail and no actions in the current rule having the matched pattern modify the response, the test proxy 119 returns the status and an unmodified response to the client device. Operations along this branch of the flowchart 400 are complete.

The client request is sent to the server and save returned status for the request (412). With reference to the example of FIG. 1, the test proxy 119 sends the client request to the server 117. The server 117 processes the client request. The server 117 returns a response that is received by the test proxy 119. This assumes that processing of the request was successful. For example, processing of the client request could fail because of an unanticipated event (e.g., server 117 being offline, network outage, etc.). Assuming that a response is returned, the test proxy 119 can save the returned status of the response and the response body (if present).

A determination is made of whether the request failed (414). For example, a determination is made of whether a response is received back from the server in response to sending the client request. With reference to the example of FIG. 1, the test proxy 119 can make this determination. For example, if no response is returned by the server prior to a defined timeout period, the test proxy 119 determines that the request failed. The client request and associated response can have matching identifiers. The test proxy 119 can determine whether a response associated with the client request A has been returned. For example, the test proxy 119 can process messages received into a message queue or message buffer. Using the matching identifier for the client request and associated response, the test proxy 119 can then determine whether a particular message from the message queue or message buffer is the associated response for the client request A from the server 117. If the request failed, operations of the flowchart 400 continue at 410. If the request did not fail, operations of the flowchart continue at 416.

Any modifications to the response are applied (416). For instance, a determination is made of whether the rule having the matched pattern includes action(s) to modify the response. With reference to the example of FIG. 1, the test proxy 119 makes this determination. The test proxy 119 determines whether action(s) in the rule having the matched pattern includes one or more actions that modify the response. For example, a change in the response can test how the client application processes a response that includes errors.

A first example action to modify the response is a "replace" action. The replace action results in the test proxy 119 modifying the response by replacing pattern of the response body with a different value. In some embodiments, the different value can be optional. If the different value is not defined for the replace action, the pattern is simply removed from the response. Below is an example syntax for a delay action defined in a rule:

```
{
"action" : "Replace",
"pattern" : "pattern XX",
"value: "value YY"
},
```

In this example syntax, the replace action causes the test proxy 119 to replace the "pattern XX" with "value YY".

A second example action to modify the response is a "remove" action. The remove action is similar to the replace action. However, the remove action causes removal of the pattern without including any replacement pattern. Below is an example syntax for a remove action defined in a rule:

```
{
"action" : "Remove",
"pattern" : "pattern RRR"
},
```

In this example syntax, the remove action causes the test proxy 119 to remove the pattern "pattern RRR" from the response.

A third example action to modify the response is a "clobber" action. A clobber action results in the test proxy 119 overwriting at least part of the response. The clobber action is similar to the replace action but includes optional parameters that define the value used to overwrite or "clobber" a portion of the response starting at a given offset in the response for a length of bytes to be "clobbered". Below is an example syntax for a clobber action defined in a rule:

```
{
"action" : "Clobber",
"pattern" : "pattern TTT",
"value" : "HHH | ?",
"offset" : "V | - n | ?",
"length" : "X | ?"
},
```

In this example syntax, the clobber action causes the test proxy 119 to overwrite or clobber the pattern "pattern TTT" in the response with a value of "HHH" starting at an offset of "V" for a length of "X" bytes. The offset is relative to the starting location of the "pattern TTT." In some embodiments, the value can be specified as a string that contains hexadecimal values (e.g., \x0D). If the length is greater than the value, the bytes from the value can be repeated until the length is reached. For example, if the value is 20 bytes and the length is 40 bytes, the value is repeated twice. Defaults for the value and the offset can be zero. Additionally, a default for the length can equal a length of the original value being replaced.

In some embodiments, one or more of the value, the offset, and the length can be assigned a value of "?" (see example syntax above). In such instances, a random value is assigned. For example, if "?" is assigned to the value, the value can be assigned a stream of random bytes. If "?" is assigned to the offset, the offset can have a range from 0% to 75%. If "?" is assigned to the length, the length can have a range from at least one byte but no more than the original length less the starting offset. Additionally, the offset may also be set to "−n" (see example syntax above). In this instance, the offset is relative to the end of the original value. For example, if the offset is set to "−5", the value begins overwriting with the value beginning at five bytes prior to the end of the pattern TTT. In another example, if the offset is set to "−0", the value is appended to the end of the pattern TTT.

A fourth example action to modify the response is a "corrupt" action. The corrupt action also results in the test proxy 119 overwriting at least part of the response. The corrupt action is similar to the clobber action. However, a "corrupt" action can overwrite areas of the response beyond the specific pattern identified. For instance, the corrupt action can cause overwriting of data in the response beyond the pattern itself in the response to be overwritten. For example, for responses based on Extensible Markup Language (XML), execution of the corrupt action could overwrite element delimiters in XML. In another example, for responses based on JavaScript Objection Notation (JSON), execution of the corrupt action could overwrite either or both of the brackets "{" and "}". Below is an example syntax for a corrupt action defined in a rule:

```
{
"action" : "Corrupt",
"pattern" : "pattern RRR",
"value" : "QQQ | ?",
"offset" : "Y | - n | ?",
"length" : "Z | ?"
},
```

In this example syntax, the corrupt action causes the test proxy 119 to overwrite or corrupt the pattern "pattern RRR" and potentially other fields in the response with a value of "QQQ" starting at an offset of "Y" for a length of "Z" bytes. The offset is relative to the starting location of the "pattern RRR." In some embodiments, the value can be specified as a string that contains hexadecimal values (e.g., \x0D). If the length is greater than the value, the bytes from the value can be repeated until the length is reached. For example, if the value is 20 bytes and the length is 40 bytes, the value is repeated twice. Defaults for the value and the offset can be zero. Additionally, a default for the length can equal a length of the original value being replaced.

In some embodiments (similar to the clobber action), one or more of the value, the offset, and the length can be assigned a value of "?" (see example syntax above). Additionally, the offset may also be set to "−n" (see example syntax above). In this instance, the offset is relative to the end of the original value. For example, if the offset is set to "−10", the value begins overwriting with the value beginning at 10 bytes prior to the end of the pattern RRR. In another example, if the offset is set to "−0", the value is appended to the end of the pattern RRR.

Returning to the flowchart 400, a determination is made of whether the rule having the matched pattern includes a delay to returning the response to the client device (418). With reference to the example of FIG. 1, the test proxy 119 can make this determination. The test proxy 119 determines whether action(s) in the rule having the matched pattern includes a delay response action. The delay response action causes a delay to be introduced before the response is returned back to the client device 115. Below is an example syntax for a delay response action defined in a rule:

```
{
"action" : "DelayResponse",
"milliseconds" : W
},
```

In this example syntax, the test proxy 119 delays sending the response back to the client device 115 "W" milliseconds. If there is a delay response action, operations of the flowchart 400 continue at 420. Otherwise, operations of the flowchart 400 continue at 422.

Forwarding of the response is delayed (defined by the specified duration) (420). With reference to the example of FIG. 1, the test proxy 119 delays forwarding the response E to the client device 115 based on the delay time defined in the delay response action.

A determination is made of whether the rule having the matched pattern includes an action to set the status attribute (422). With reference to the example of FIG. 1, the test proxy 119 determines whether the rule having the matched pattern includes a "set status" action. As described above, each rule can include a list of one or more actions to be executed. The test proxy 119 determines whether action(s) to be executed includes a set status action. Below is an example syntax for a set status action defined in a rule:

```
{
"action" : "SetStatus",
"returnStatus" : "n" -- status returned
},
```

The set status action is similar to the fail action. The set status action modifies a status of the client request that is returned to the client device. The status can be an integer value that can be interpreted by the client device that further defines the status of the processing of the client request. For example, the status of a client request can be set to "accepted", "processing", etc. In contrast to the fail action, the set status action does not result in the test proxy 119 not forwarding the client request to the server 117 and not returning a response to the client request received from the server 117 back to the client device 115. If there is an action to set the status, operations of the flowchart 400 continue at 424. Otherwise, operations of the flowchart 400 continue at 410.

Status of the client request is set (424). With reference to the example of FIG. 1, the test proxy 119 sets the status. The status can be an integer value representing a status of the client request (e.g., "accepted", "processing", etc.). Operations of the flowchart 400 then continue at 410.

Example Computer Device

Figure 5:
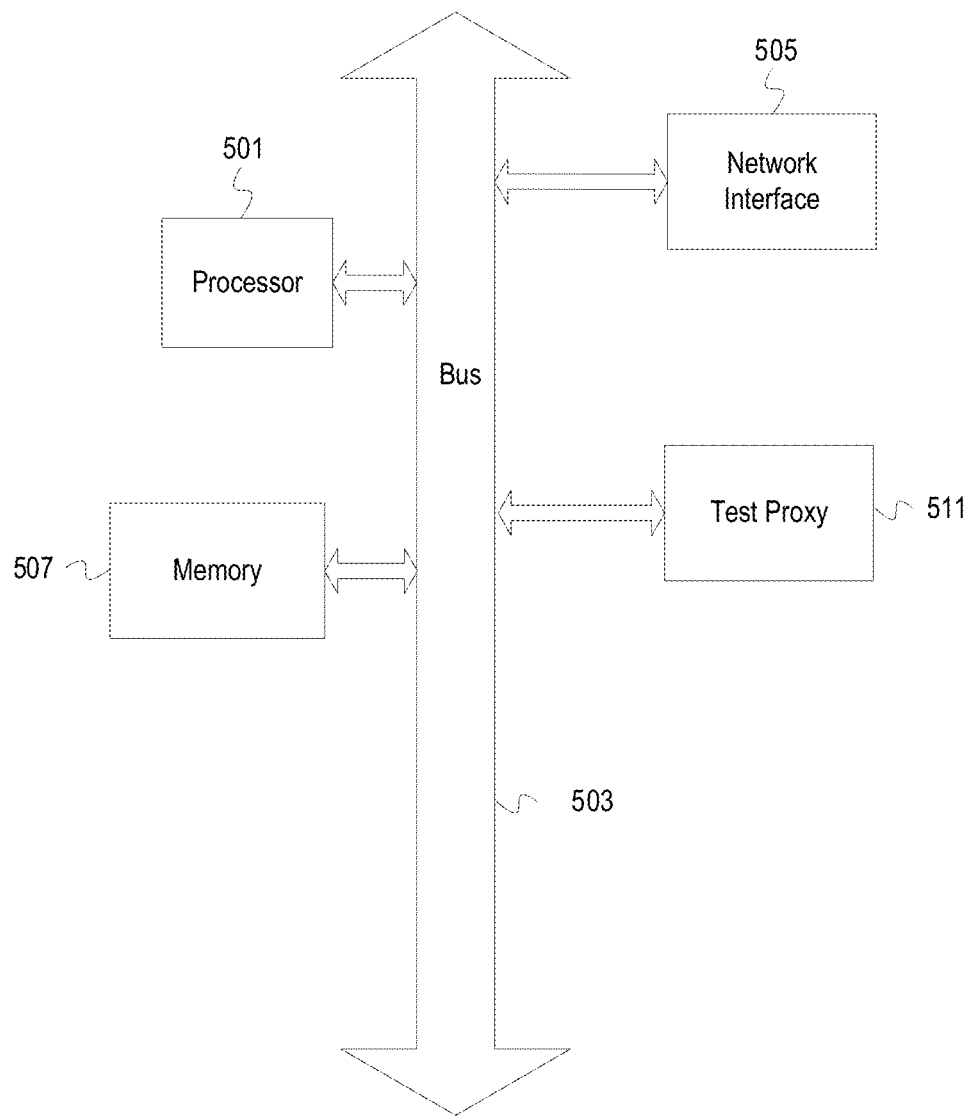
FIG. 5 depicts an example computer device.

FIG. 5 depicts an example computer device for backup and recovery of application data in a virtual machine. With reference to FIG. 1, the computer device of FIG. 5 can represent a device that is configured to execute the test proxy 119. The computer device includes a processor 501 (possibly including multiple processors, multiple cores, multiple nodes, and/or implementing multi-threading, etc.). The computer system includes memory 507. The memory 507 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computer system also includes a bus 503 (e.g., PCI, ISA, PCI-Express, HyperTransport® bus, InfiniBand® bus, NuBus, etc.) and a network interface 505 (e.g., a Fiber Channel interface, an Ethernet interface, an internet small computer system interface, SONET interface, wireless interface, etc.). The system communicates via transmissions to and/or from remote devices via the network interface 505 in accordance with a network protocol corresponding to the type of network interface, whether wired or wireless and depending upon the carrying medium. In addition, a communication or transmission can involve other layers of a communication protocol and or communication protocol suites (e.g., transmission control protocol, Internet Protocol, user datagram protocol, virtual private network protocols, etc.).

The system also includes a test proxy 511. The test proxy 511 performs operations to test client application and web service interactions and operations (as described above). Any one of the previously described functionalities may be partially (or entirely) implemented in hardware and/or on the processor 501. For example, the functionality may be implemented with an application specific integrated circuit, in logic implemented in the processor 501, in a co-processor on a peripheral device or card, etc. Further, realizations may include fewer or additional components not illustrated in FIG. 5 (e.g., video cards, audio cards, additional network interfaces, peripheral devices, etc.). The processor 501 and the network interface 505 are coupled to the bus 503. Although illustrated as being coupled to the bus 503, the memory 507 may be coupled to the processor 501.

Variations

In the examples described above, the client request is to satisfy the threshold trigger condition and not satisfy the reset condition prior to performing action(s) in the rule. However, in some other embodiments, the client request is not required to satisfy these additional criteria. Also in the examples described above, the client request itself is not modified by an action in the rule having the matched pattern. However, in some other embodiments, the client request is modified. For example, the action of the client request is changed. In another example, the resource of the client request is changed.

The flowcharts are provided to aid in understanding the illustrations and are not to be used to limit scope of the claims. The flowcharts depict example operations that can vary within the scope of the claims. Additional operations may be performed; fewer operations may be performed; the operations may be performed in parallel; and the operations may be performed in a different order. It will be understood that each block of the flowchart illustrations and/or block diagrams, and combinations of blocks in the flowchart illustrations and/or block diagrams, can be implemented by program code. The program code may be provided to a processor of a general purpose computer, special purpose computer, or other programmable machine or apparatus.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine readable medium(s) may be utilized. The machine readable medium may be a machine readable signal medium or a machine readable storage medium. A machine readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine readable storage medium may be any tangible medium that can contain, or store a program for use by or in connection with an instruction execution system, apparatus, or device. A machine readable storage medium is not a machine readable signal medium.

A machine readable signal medium may include a propagated data signal with machine readable program code embodied therein, for example, in baseband or as part of a carrier wave. Such a propagated signal may take any of a variety of forms, including, but not limited to, electromagnetic, optical, or any suitable combination thereof. A machine readable signal medium may be any machine readable medium that is not a machine readable storage medium and that can communicate, propagate, or transport a program for use by or in connection with an instruction execution system, apparatus, or device.

Program code embodied on a machine readable medium may be transmitted using any appropriate medium, including but not limited to wireless, wireline, optical fiber cable, RF, etc., or any suitable combination of the foregoing.

Computer program code for carrying out operations for aspects of the disclosure may be written in any combination of one or more programming languages, including an object oriented programming language such as the Java® programming language, C++ or the like; a dynamic programming language such as Python; a scripting language such as Perl programming language or PowerShell script language; and conventional procedural programming languages, such as the "C" programming language or similar programming languages. The program code may execute entirely on a stand-alone machine, may execute in a distributed manner across multiple machines, and may execute on one machine while providing results and or accepting input on another machine.

The program code/instructions may also be stored in a machine readable medium that can direct a machine to function in a particular manner, such that the instructions stored in the machine readable medium produce an article of manufacture including instructions which implement the function/act specified in the flowchart and/or block diagram block or blocks.

While the aspects of the disclosure are described with reference to various implementations and exploitations, it will be understood that these aspects are illustrative and that the scope of the claims is not limited to them. In general, techniques for backup and recovery of application data in a virtual machine as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure. In general, structures and functionality presented as separate components in the example configurations may be implemented as a combined structure or component. Similarly, structures and functionality presented as a single component may be implemented as separate components. These and other variations, modifications, additions, and improvements may fall within the scope of the disclosure.

As used herein, the term "or" is inclusive unless otherwise explicitly noted. Thus, the phrase "at least one of A, B, or C" is satisfied by any element from the set {A, B, C} or any combination thereof, including multiples of any element.

What is claimed is:

1. A method comprising:
   intercepting a client request originating from a client device and destined for a server via a network, wherein the server is configured to perform a service in response to the client request, the client request comprising a request action and a request resource;
   determining whether the request action and the request resource of the client request matches a pattern action and a pattern resource indicated in a pattern in a rule;
   based on a determination that the request action and the request resource of the client request matches the pattern action and the pattern resource, determining whether a threshold trigger condition in the rule is satisfied based, at least in part, on a first random value, wherein the trigger condition corresponds to frequency of performing a testing related action specified in the rule;
   based on a determination that the threshold trigger condition is satisfied, determining whether a reset condition in the rule is not satisfied, wherein the reset condition is based, at least in part, on occurrences of a match between the request action and the request resource of the client request and the pattern action and the pattern resource indicated in the pattern and wherein the reset condition corresponds to a number of times to perform the testing related action; and
   based on a determination that the reset condition is not satisfied, performing at least one testing related action associated with the pattern in the rule, wherein performing the at least one testing related action comprises returning an errored response back to the client device in response to the client request.

2. The method of claim 1, further comprising: forwarding the client request to the server; and receiving a server response from the server, wherein the errored response is an altered version of the server response.

3. The method of claim 1, wherein performing the at least one testing related action comprises modifying at least a portion of the rule.

4. The method of claim 1, wherein the rule is within a rule set, wherein performing the at least one testing related action comprises modifying at least a portion of a different rule in the rule set, wherein the at least portion of the different rule comprises at least one of a pattern and a testing related action of the different rule.

5. The method of claim 1, wherein the rule is within a rule set, wherein performing the at least one testing related action comprises adding a new rule to the rule set, wherein the new rule comprises a new pattern having a new pattern action and a new pattern resource, wherein a combination of the new pattern action and the new pattern resource is different than a combination of the pattern action and the pattern resource.

6. The method of claim 5, wherein the new rule comprises a new threshold trigger condition and a new reset condition, wherein the new threshold trigger condition is the same as the threshold trigger condition and the new reset condition is the same as the reset condition.

7. The method of claim 1, further comprising:
   based a determination that the reset condition is satisfied, resetting the pattern, wherein resetting the pattern comprises re-determining whether the threshold trigger condition is satisfied and re-determining whether the reset condition is not satisfied prior to performing the at least one testing related action associated with the pattern.

8. The method of claim 1, wherein performing the at least one testing related action comprises returning a faded status without returning a response back to the client device in response to the client request.

9. The method of claim 8, wherein performing the at least one testing related action comprises returning the failed status, wherein the method further comprises:
   aborting a transmission of the client request to the server.

10. An apparatus comprising:
a processor; and
a machine-readable medium having program code executable by the processor to cause the apparatus to:
intercept a client request originating from a client device and destined for a server via a network, wherein the server is configured to perform a service in response to the client request, the client request comprising a request action and a request resource;
determine whether the request action and the request resource of the client request matches a pattern action and a pattern resource indicated in a pattern in a rule;
based on a determination that the request action and the request resource of the client request matches the pattern action and the pattern resource, determine whether a threshold trigger condition in the rule is satisfied based, at least in part, on a first random value, wherein the trigger condition corresponds to frequency of performing a testing related action specified in the rule;
based on a determination that the threshold trigger condition is satisfied, determine whether a reset condition in the rule is not satisfied, wherein the reset condition is based, at least in part, on occurrences of a match between the request action and the request resource of the client request and the pattern action and the pattern resource indicated in the pattern and wherein the reset condition corresponds to a number of times to perform the testing related action; and
based on a determination that the reset condition is not satisfied, perform at least one testing related action associated with the pattern in the rule, wherein the program code executable by the processor to cause the apparatus to perform the at least one testing related action comprises program code executable by the processor to cause the apparatus to return an errored response back to the client device in response to the client request.

11. The apparatus of claim 10, wherein the program code comprises program code executable by the processor to cause the apparatus to:
forward the client request to the server; and
receive a server response from the server, wherein the errored response is an altered version of the server response.

12. The apparatus of claim 10, wherein the program code executable by the processor to cause the apparatus to perform the at least one to sting related action comprises program code executable by the processor to cause the apparatus to modify at least a portion of the rule.

13. The apparatus of claim 10, wherein the rule is within a rule set, wherein the program code executable by the processor to cause the apparatus to perform the at least one testing related action comprises program code executable by the processor to cause the apparatus to modify at least a portion of a different rule in the rule set, wherein the at least portion of the different rule comprises at least one of a pattern and a testing related action of the different rule.

14. The apparatus of claim 10, wherein the rule is within a rule set, wherein the program code executable by the processor to cause the apparatus to perform the at least one testing related action comprises program code executable by the processor to cause the apparatus to add a new rule to the rule set, wherein the new rule comprises a new pattern having a new pattern action and a new pattern resource, wherein a combination of the new pattern action and the new pattern resource is different than a combination of the pattern action and the pattern resource.

15. The apparatus of claim 14, wherein the new rule comprises a new threshold trigger condition and a new reset condition, wherein the new threshold trigger condition is the same as the threshold trigger condition and the new reset condition is the same as the reset condition.

16. The apparatus of claim 10, wherein the program code comprises program code executable by the processor to cause the apparatus to:
based a determination that the reset condition is satisfied, reset the pattern, wherein the program code executable by the processor to cause the apparatus to reset the pattern comprises program code executable by the processor to cause the apparatus to re-determine whether the threshold trigger condition is satisfied and re-determine whether the reset condition is not satisfied prior to performance of the at least one testing related action associated with the pattern.

17. The apparatus of claim 10, wherein the program code executable by the processor to cause the apparatus to perform the at least one testing related action comprises program code executable by the processor to cause the apparatus to return a faded status without a return of a response back to the client device in response to the client request.

18. The apparatus of claim 17, wherein the program code executable by the processor to cause the apparatus to perform the at least one testing related action comprises wherein the program code executable by the processor to cause the apparatus to return the failed status, wherein the program code comprises program code executable by the processor to cause the apparatus to:
abort a transmission of the client request to the server.

19. One or more non-transitory machine-readable-media having program code for a testing proxy stored therein, the program code comprising instructions to:
intercept a client request originating from a client device and destined for a server via a network, wherein the server is configured to perform a service in response to the client request, the client request comprising a request action and a request resource;
determine whether the request action and the request resource of the client request matches a pattern action and a pattern resource indicated in a pattern in a rule;
based on a determination that the request action and the request resource of the client request matches the pattern action and the pattern resource, determine whether a threshold trigger condition in the rule is satisfied based, at least in part, on a first random value, wherein the trigger condition corresponds to frequency of performing a testing related action specified in the rule;
based on a determination that the threshold trigger condition is satisfied, determine whether a reset condition in the rule is not satisfied, wherein the reset condition is based, at least in part, on at least one occurrences of a match between the request action and the request resource of the client request and the pattern action and the pattern resource indicated in the pattern and wherein the reset condition corresponds to a number of times to perform the testing related action; and
based on a determination that the reset condition is not satisfied, perform at least one testing related action associated with the pattern in the rule, wherein the instructions to perform the at least one testing related action comprises instructions to modify of at least a portion of a different rule, wherein the at least portion of the different rule comprises at least one of a pattern and an action of the different rule.

20. The one or more machine-readable storage media of claim 19, wherein the instructions to perform the at least one testing related action comprises instructions to modify at least a portion of the rule.

* * * * *